United States Patent [19]

Machado

[11] Patent Number: 5,175,210
[45] Date of Patent: Dec. 29, 1992

[54] POLYMER BLENDS
[75] Inventor: Joseph M. Machado, Richmond, Tex.
[73] Assignee: Shell Oil Company, Houston, Tex.
[21] Appl. No.: 715,161
[22] Filed: Jun. 14, 1991
[51] Int. Cl.$^5$ .............. C08G 67/02; C08L 77/00
[52] U.S. Cl. .................. 525/64; 525/66; 525/185; 525/426; 525/539
[58] Field of Search ........... 525/66, 539, 64, 426, 525/185

[56] References Cited

U.S. PATENT DOCUMENTS

| | | | |
|---|---|---|---|
| H988 | 11/1991 | Gergen et al. | 525/179 |
| 2,495,286 | 1/1950 | Brubaker et al. | 260/63 |
| 3,113,986 | 12/1963 | Breslow et al. | 260/683.9 |
| 3,251,905 | 5/1966 | Zelinski | 260/879 |
| 3,390,207 | 6/1968 | Moss et al. | 260/879 |
| 3,598,887 | 8/1971 | Darcy et al. | 260/879 |
| 3,694,412 | 9/1972 | Nozaki | 260/63 |
| 4,219,627 | 8/1980 | Halasa et al. | 525/89 |
| 4,226,952 | 10/1980 | Halasa et al. | 525/192 |
| 4,292,414 | 9/1981 | Saito et al. | 525/255 |
| 4,427,828 | 1/1984 | Hergenrother et al. | 525/66 |
| 4,578,419 | 3/1986 | Hall | 524/401 |
| 4,628,072 | 12/1986 | Yamato et al. | 525/57 |
| 4,657,971 | 4/1987 | Yamato et al. | 525/57 |
| 4,659,970 | 4/1987 | Melocik | 318/269 |
| 4,670,173 | 6/1987 | Hayashi et al. | 252/51.5 |
| 4,822,871 | 4/1989 | Klingensmith | 528/392 |
| 4,839,437 | 6/1989 | Gergen et al. | 525/426 |
| 4,864,242 | 9/1989 | George et al. | 525/64 |
| 4,880,865 | 11/1989 | George | 524/449 |
| 4,904,728 | 2/1990 | George | 525/64 |
| 4,960,838 | 10/1990 | Gergen et al. | 525/539 |
| 5,043,389 | 8/1991 | Gergen et al. | 525/539 |
| 5,068,289 | 11/1991 | George et al. | 525/539 |
| 5,084,518 | 1/1992 | George et al. | 525/539 |

FOREIGN PATENT DOCUMENTS

| | | |
|---|---|---|
| 1121965 | 3/1984 | European Pat. Off. . |
| 0181014 | 3/1985 | European Pat. Off. . |
| 0213671 | 8/1986 | European Pat. Off. . |
| 0257663 | 6/1987 | European Pat. Off. . |
| 1081304 | 2/1966 | United Kingdom . |

Primary Examiner—James J. Seidleck
Assistant Examiner—Thomas Hamilton, III
Attorney, Agent, or Firm—James O. Okorafor

[57] ABSTRACT

Improved polymer blends comprise (a) a linear alternating polymer of carbon monoxide and at least one ethylenically unsaturated hydrocarbon, (b) a polymeric polyamide, (c) a maleated, partially hydrogenated elastomeric block copolymer, and optionally (d) an acidic polymer of an $\alpha$-olefin and an $\alpha,\beta$-ethylenically unsaturated carboxylic acid wherein, optionally, a portion of the carboxylic acid groups have been neutralized with non-alkali metal. The blends demonstrate a good balance of strength and toughness.

11 Claims, No Drawings

POLYMER BLENDS

FIELD OF THE INVENTION

This invention relates to an improved polymer blend comprising a linear alternating polymer of carbon monoxide and at least one ethylenically unsaturated hydrocarbon and a polyamide, with other polymeric material. More particularly, the invention relates to a blend of the linear alternating polymer of carbon monoxide and at least one ethylenically unsaturated hydrocarbon, a polymeric polyamide, and a maleated, partially hydrogenated block copolymer. Optionally, the blend may also contain an acidic polymer containing moieties of an α-olefin and an α,β-ethylenically unsaturated carboxylic acid.

BACKGROUND OF THE INVENTION

Polymers of carbon monoxide and olefins generally referred to as polyketones are well known in the art. Such polymers are disclosed in, for examples U.S. Pat. Nos. 2,495,286, 3,694,412 and U.K. 1,081,304 which are herein incorporated by reference.

Of particular interest among polyketone polymers, are the class of linear alternating polymers of carbon monoxide and at least one ethylenically unsaturated hydrocarbon. This type of polymers are disclosed in European Patent Applications such as Nos. 121,965, 181,014, 213,671, and 257,663 which are herein incorporated by reference. Additionally, this class of polymers are disclosed in numerous U.S. patents assigned to Shell Oil Company, exemplified by U.S. Pat. Nos. 4,880,865, and 4,822,871 which are herein incorporated by reference.

Polymeric polyamides frequently referred to as "Nylons" are well known in the art. These polymers are thermoplastic and possess good properties which make them useful in a number of applications ranging from fibers and yarns to structural materials. However, these polyamides are known to have poor resistance to impact and tend to be brittle rather than ductile, particularly when dry.

Block copolymers of vinyl aromatic hydrocarbons and alkadienes which are partially hydrogenated and maleated are known in the art. Hereinafter, these block copolymers may sometimes simply be referred to as elastomers. These block copolymers are commercially available and are marketed by Shell Chemical Company as KRATON ® Thermoplastic Rubber.

It is known in the art that certain functionalized elastomers can be used to toughen polyketones. This toughening effect is, however, dependent on the quantity of elastomer used. The art teaches that maximum toughness for this binary blend occurs with about 5 wt % elastomer. At higher levels, as a result of limited capability, the properties of the binary blend drop off considerably.

Binary blends of polyamides and elastomers are known in the art. While these blends give some good properties, they are not appropriate for usage in many applications, especially those where a polyketone matrix is more desirable than a polyamide matrix. This preference for a polyketone matrix is in part due to its less sensitivity to moisture, better resistance to hydrolysis, acids, bases, salt solutions and other solvents.

Although it would be desirable to produce a ternary blend of polyketones, nylon, and relatively large amounts of KRATON ®, this desire appears to be limited by the teachings of the prior art. For instance, it is not known that greater than 5 wt % KRATON ® can be effectively dispersed in such a blend, nor is it known whether or not the components of such a ternary blend would be compatible. Nevertheless, the need and/or attraction for such a ternary blend having an overall balance of improved properties continues to exist.

SUMMARY OF THE INVENTION

It is an object of the invention to provide a composition comprising a ternary blend of polymeric materials. It is an object of the invention to provide a ternary blend of polyketones, nylon, and KRATON ® having an overall balance of improved mechanical properties.

Accordingly, it is now provided a ternary blend composition comprising of a linear alternating polymer of carbon monoxide and at least one ethylenically unsaturated hydrocarbon, polymeric polyamides, and a maleated partially hydrogenated block copolymer, having a good balance of properties of strength and toughness in which the polyketone polymer serves as a matrix and in which the polymeric polyamide functions as a compatibilizer. Optionally, the inventive ternary blend may also contain an acidic polymer containing moieties of an α-olefin and an α,β-ethylenically unsaturated carboxylic acid.

DESCRIPTION OF THE INVENTION

The polyketone polymers which are employed as a principal component in the blends of the invention are of a linear alternating structure and contain substantially one molecule of carbon monoxide for each molecule of ethylenically unsaturated hydrocarbon. Suitable ethylenically unsaturated hydrocarbons for use as precursors of the polyketone polymers have up to 20 carbon atoms inclusive, and are aliphatic such as ethylene and other α-olefins including propylene, 1-butene, isobutylene, 1-hexene, 1-octene and 1-dodecene, or are arylaliphatic having an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. The preferred polymers are copolymers of carbon monoxide and ethylene or terpolymers of carbon monoxide, ethylene and a second hydrocarbon of at least 3 carbon atoms, particularly an α-olefin such as propylene.

When the preferred polyketone terpolymers are employed in the blends of the invention, there will be within the terpolymer at least about two units incorporating a moiety of ethylene for each unit incorporating a moiety of the second hydrocarbon. Preferably, there will be from about 10 units to about 100 units incorporating a moiety of ethylene for each unit incorporating a moiety of the second hydrocarbon. The polymer chain of the preferred polyketone polymers is therefore represented by the repeating formula

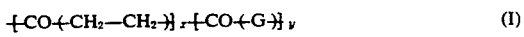 (I)

wherein G is the moiety of an ethylenically unsaturated hydrocarbon of at least 3 carbon atoms polymerized through the ethylenic unsaturation thereof. The $-CO-(CH_2CH_2)-$ units and the $CO-(G)-$ units are found randomly throughout the polymer chain and the ratio of y:x is no more than about 0.5. When copolymers of carbon monoxide and ethylene are employed in the blends of the invention there will be no second hydrocarbon present and the polymers are represented by the above formula (I) wherein y is zero. When y is other than zero, i.e., terpolymers are employed, preferred ratios of y:x are from about 0.01 to about 0.1. The end groups or "caps" of the polymer chain will depend upon what materials were present during the production of the polymer and how and whether the polymer was purified. The precise nature of the end groups does not appear to influence the properties of the polymer to any considerable extent so that the polymers are fairly represented by the formula for the polymeric chain as depicted above.

Of particular interest are the polyketone polymers of number average molecular weight from about 1000 to about 200,000, particularly those polymers of number average molecular weight from about 20,000 to about 90,000 as determined by gel phase chromatography. The physical properties of the polymers will depend in part upon the molecular weight, whether the polymer is a copolymer or a terpolymer and, in the case of the terpolymers, the nature of and the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

The general methods for the production of the polyketone polymers are illustrated by the above published European Patent Applications. The carbon monoxide and hydrocarbon monomers are contacted under polymerization conditions in the presence of a catalyst composition typically formed from a compound of palladium, the anion of a non-hydrohalogenic acid having a pKa (measured in water at 18° C.) of below about 6, preferably below 2, and a bidentate ligand of phosphorus. The scope of the polymerization process is extensive but, without wishing to be limited, a preferred palladium compound is a palladium carboxylate, particularly palladium acetate, a preferred anion is the anion of trifluoroacetic acid or p-toluenesulfonic acid, and a preferred bidentate ligand is 1,3-bis(diphenylphosphino)propane or 1,3-bis[di(2-methoxyphenyl)phosphino]propane.

The reaction diluent in which the polymerization is conducted is preferably an alkanol such as methanol or ethanol. Methanol is preferred. The reactants, catalyst composition and reaction diluent are contacted by conventional methods such as shaking, stirring or refluxing in a suitable reaction vessel. Typical polymerization conditions include a reaction temperature from about 20° C. to about 150° C., preferably from about 50° C. to about 135° C. The reaction pressure is suitably from about 1 atmosphere to about 200 atmospheres but pressures from about 10 atmospheres to about 100 atmospheres are more frequently employed. Subsequent to polymerization reaction is terminated as by cooling the reactor and contents and releasing the pressure. The polyketone polymer is typically obtained as a product substantially insoluble in the reaction diluent and the polymer is recovered by conventional procedures such as filtration or decantation. The polymer is used in the blends of the invention as recovered or the polymer is purified as by contact with a solvent or an extraction agent selective for the catalyst residues.

The polyketone polymer is present as a principal component of the blends of the invention and is employed in quantities from about 5% by weight to about 94.5% by weight, based on total blend, and preferably from about 20% by weight to about 80% by weight on the same basis. In a preferred embodiment of the blends of the invention, the polyketone polymer is present as the predominant blend component, being present in quantities from about 65% by weight to about 85% by weight, based on total blend.

A second principal component of the blends of the invention is a polymeric polyamide. By the term "polyamide" is meant a polymeric condensation product which contains recurring amide groups as integral parts of the polymeric chain. Suitable polyamides for use in the reinforced blends of the invention are crystalline or amorphous polymers of linear or branched structure and a molecular weight of at least about 5000. The preferred polyamides are linear in structure, wherein each recurring unit has up to 16 carbon atoms inclusive, and have melting points above 200° C.

In one embodiment of the polyamide blend component the polyamide is homopolymeric in character illustratively being a homopolymer of a terminal aminocarboxylic acid of up to 16 carbon atoms although in practice the monomeric unit is typically provided as a lactam, e.g., butyrolactam, caprolactam or lauryllactam. These polymers are often identified by the number of carbon atoms in the monomeric unit. For example, the polyamide illustratively derived from 6-aminocaproic acid or alternatively from caprolactam is termed Nylon 6.

In another embodiment of the polyamide blend component the polyamide is copolymeric in character and is illustratively represented as a condensation product of a primary diamine and a dicarboxylic acid. The primary diamine is preferably a terminal primary diamine having up to 16 carbon atoms inclusive and at least two carbon atoms between the primary amino groups located on terminal carbon atoms of the diamine structure. The diamines suitably contain aromatic moieties linking the amino groups as illustrated by phenylenediamine, 4,4'-diaminobiphenyl and di(4-aminophenyl) ether, or the diamines contain cycloaliphatic linking moieties such as in the case of di(4-aminocyclohexyl)methane or 1,4-diaminocycllooctane. The preferred diamines, however, are the acyclic terminal primary diamines of the formula

wherein n is an integer from 2 to 16 inclusive. Such polymethylenediamines include trimethylenediamine, tetramethylenediamine, hexamethylenediamine, decamethylenediamine, dodecamethylenediamine and hexadecamethylenediamine. Of these diamines, hexamethylenediamine is preferred.

The dicarboxylic acids which are illustrative precursors of the copolymeric polyamides have up to 16 carbon atoms inclusive as illustrated by aromatic carboxylic acids such as isophthalic acid, terephthalic acid and 2,6-naphthalenedicarboxylic acid. The preferred dicarboxylic acids, however, are aliphatic dicarboxylic acids, particularly those of the formula

wherein m is an integer from 0 to 14 inclusive. Illustrative of these dicarboxylic acids are oxalic acid, pimelic acid, sebacic acid, suberic acid, undecanedioic acid and adipic acid. Particularly preferred as the dicarboxylic acid is adipic acid.

The production of this polyamide blend component is well known and conventional in the art. It should be understood that although the copolymeric polyamides are considered above as condensation products of primary diamines and dicarboxylic acids, this representation is for convenience and the acid monomer may be suitably provided in an equivalent form, e.g., as the dialkyl ester of the dicarboxylic acid. The copolymeric polyamides are also often identified in terms of the number of carbon atoms in the amine and acid monomers. For example, the condensation product illustratively produced from hexamethylenediamine and adipic acid is termed Nylon 6,6. The polyamide illustratively produced from hexamethylenediamine and dodecanedioic acid is termed Nylon 6,12.

The polyamide polymer is present as a second component of the blends of the invention and is employed in quantities from about 5% by weight to about 94.5% by weight, based on total blend. In one preferred embodiment of the inventive blend, the polymeric polyamide is present in an amount of from about 5 to about 20 wt % based on the total polymer. In another preferred embodiment of the blends of the invention, the polyamide polymer is present in an amount of from about 35% by weight to about 48% by weight, based on total polymer and the polyketone polymer is also employed in an amount within this range and preferably in an amount substantially equal to the amount of polyamide.

The third component of the blends of the invention, present as a minor component, is a modified block copolymer which has been partially hydrogenated and further modified by the grafting of a maleic acid compound onto the block copolymer chain. The term "block copolymer" is used to indicate a thermoplastic elastomer characterized by at least one block of at least predominantly polymerized vinyl aromatic hydrocarbon (A block) and at least one block of at least predominantly polymerized alkadiene (B block).

The vinyl aromatic hydrocarbon useful as the precursor of A blocks has a vinyl group, i.e., a

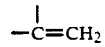

group, attached directly to an aromatic ring and up to 12 carbon atoms inclusive. Preferred vinyl aromatic compounds are styrene and styrene homologs such as those of the formula

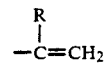 (IV)

wherein R independently is hydrogen or lower alkyl of up to 4 carbon atoms inclusive. Illustrative of such compounds are styrene, α-methylstyrene, α-ethylstyrene, p-methylstyrene, m-isopropylstyrene and α,4-dimethylstyrene. Styrene and α-methylstyrene constitute a preferred class of such vinyl aromatic compounds and particularly preferred is styrene.

The A blocks of the block copolymer independently are at least predominantly the polymerized vinyl aromatic compound and preferably are homopolymeric blocks. Alternatively, however, one or more A blocks are blocks wherein some of the monomer of block B is provided before the polymerization of block A is complete. Such blocks are termed "tapered" and have at least about 85% by mol and preferably at least about 93% by mol of the polymerized vinyl aromatic compound with any remainder being the conjugated alkadiene of block B. A blocks containing a mixture of vinyl aromatic hydrocarbons are also suitable but are less preferred. The average molecular weight of an A block is typically from about 5,000 to about 125,000 while A blocks of an average molecular weight from about 7,000 to about 125,000 are preferred.

Each B block independently is at least predominantly polymerized conjugated alkadiene. The alkadienes useful as the monomer for a B block are conjugated alkadienes of up to 8 carbon atoms inclusive such as those conjugated alkadienes of the formula

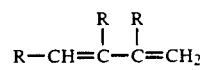

wherein R has the previously stated meaning. Illustrative of such alkadienes are butadiene, isoprene, 2,3-dimethylbutadiene, 1,3-octadiene and 1,3-pentadiene. Preferred alkadienes are butadiene and isoprene, of which butadiene is particularly preferred. Each B block is at least predominantly polymerized alkadiene with the B block being at least 85% by mol and preferably at least 93% by mol of the polymerized alkadiene with any remainder being the vinyl aromatic hydrocarbon of A block in the case of a tapered block. Homopolymeric blocks as B block are preferred although tapered blocks or blocks of mixed alkadienes are also satisfactory. Within a polymerized alkadiene block two modes of polymerization are possible. In what is termed a 1,4-polymerization, both carbon-carbon double bonds of the conjugated alkadiene are involved in the polymerization such that each carbon atom of the double bonds is incorporated within the polymer chain which includes the central two atoms of the alkadiene moiety connected by an ethylenic linkage. In a 1,2 polymerization, the polymerization involves only one carbon-carbon double bond of the conjugated alkadiene and only those two carbon atoms are incorporated within the polymer chain. The carbon atoms of the conjugated alkadiene that are not incorporated within the polymer chain form one or more pendant groups, at least one of which contains ethylenic unsaturation.

Preferred block copolymers are those wherein from about 25% to about 55% of the units of each B block are the result of 1,2-polymerization. The average molecular weight of a B block is from about 10,000 to about 300,000, preferably from about 30,000 to about 150,000.

Within the block copolymers, the A blocks will total from about 2% by weight to about 65% by weight, based on total block copolymer. Contents of A block from about 10% by weight to about 30% by weight on the same basis are preferred. The total molecular weight of the block copolymer will average from about 25,000 to about 350,000, preferably from about 35,000 to about 300,000. These average molecular weights are determined by conventional methods such as tritium counting methods or osmotic pressure measurements.

The structure of the block copolymer will depend upon the method of polymerization employed to produce the block copolymer. In one modification the block copolymer is termed linear and is produced by sequential polymerization of the blocks. By way of example in producing a three block polymer, the vinyl aromatic hydrocarbon of block A is polymerized through the use of an initiator, preferably an alkyl lithium compound. The conjugated alkadiene of block B is then introduced and subsequently the vinyl aromatic hydrocarbon required for a second A block. Such a block copolymer is characterized as ABA. When a two block or diblock polymer is produced by polymerizing the vinyl aromatic hydrocarbon with a lithium alkyl initiator and subsequently introducing the conjugated alkadiene required for a B block, the resulting block copolymer is characterized as AB. Substantially complete polymerization of each monomer prior to introducing the monomer of the next block will result in the production of homopolymeric blocks. If, prior to the complete polymerization of any one block the monomer of the next block is introduced, tapered blocks will result, Similar sequential polymerization techniques are employed to produce block copolymers characterized as ABABA, ABAB, ABABABA or polymers of an even higher number of blocks. Production of block copolymers, particularly those of a relatively high number of blocks, is also accomplished by use of a coupling agent to couple or connect growing polymer chains. Use of a difunctional coupling agent such as a dihaloalkane will result in production of linear polymers but use of a coupling agent having a functionality of 3 or more, e.g., silicon tetrahalides or alkyl esters of dicarboxylic acids will result in non-linear polymers which are termed "radial" or "branched", respectively. These block copolymers are well known in the art and the characterization and production of such polymers are illustrated by U.S. Pat. Nos. 3,251,905, 3,390,207, 3,598,887 and 4,219,627.

The block copolymers useful as precursors of the blend component of the invention are preferably linear alternating polymers of the types such as polystyrene-polybutadiene (SB), polystyrene-polyisoprene (SI), polystyrene-polybutadiene-polystyrene (SBS), polystyrene-polyisoprene-polystyrene (SIS), and poly($\alpha$-methylstyrene)-polybutadiene-poly($\alpha$-methylstyrene). Block copolymers of the SBS type are particularly preferred.

To produce the components of the blends of the invention, the block copolymers are partially hydrogenated and then modified further by reaction with a maleic acid compound. The hydrogenation of block copolymers is also well known in the art and includes catalytic hydrogenation in the presence of Raney Nickel or elemental noble metal in finely divided form including platinum or palladium. Such hydrogenation typically results in hydrogenation of most if not all of the unsaturation of the aromatic rings in the A blocks as well as the unsaturation in the aliphatic B block. In the production of the components of the blends of the invention, a partial hydrogenation is employed which serves to hydrogenate most of the ethylenic unsaturation of the aliphatic B block while hydrogenating little of the aromatic unsaturation of A block. This process of partial hydrogenation is well known and conventional and is illustrated by U.S. Pat. Nos. 3,113,986 and 4,226,952. Preferred partially hydrogenated block copolymers are those wherein no more than 25% and preferably no more than 5% of the aromatic unsaturation has been hydrogenated and wherein the residual unsaturation of the B blocks is from about 0.5% to about 20% of the unsaturation prior to hydrogenation.

The partially hydrogenated block copolymer is often identified by the structure of the block copolymer precursor and the "apparent" structure of the aliphatic block. Thus, partial hydrogenation of an SBS block copolymer will result in a polymer having a hydrogenated mid-block which is apparently polyethylene in the case of a mid-block produced by 1,4-polymerization and ethylene/butylene copolymer in the case of a mid-block produced with a high proportion of 1,2-polymerization. These partially hydrogenated block copolymers are indicated as SES and SEBS, respectively. A corresponding two block or diblock polymer would be termed SE or SEB. A polymer produced by partial hydrogenation of a SIS block copolymer of a high degree of 1,4-polymerization in the mid-block is termed, upon partial hydrogenation, a SEPS polymer because of the similarity of the mid-block to an ethylene/propylene copolymer.

To produce the preferred maleated, partially hydrogenated block copolymers employed as components of the blends of the invention, the partially hydrogenated block copolymers are of the SES/SEBS type wherein units of the mid-block are from about 45% to about 65% of the E type mid-block with the remainder being of the EB type. The partially hydrogenated block copolymers of these types are also well known in the art with a number being commercial. For example, certain of the partially hydrogenated block copolymers are marketed by Shell Chemical Company as KRATON G ® Thermoplastic Rubber.

The maleated, partially hydrogenated block copolymer employed as blend component is an adduct of the partially hydrogenated block copolymer and a maleic acid compound. The maleated materials are illustratively produced by addition of a hydrogen atom located on a carbon atom allylic to residual aliphatic unsaturation of the partially hydrogenated block copolymer to the carbon-carbon double bond of the maleic acid compound together with the formation of a carbon-carbon bond between the maleic acid compound and the polymer chain of the partially hydrogenated block copolymer. By way of further illustration but without wishing to be bound by any particular reaction theory, the production of maleated derivatives takes place according to the reaction scheme which follows using maleic anhydride as an illustrative maleic acid compound and wherein the wavy lines represent the continuing polymer chain.

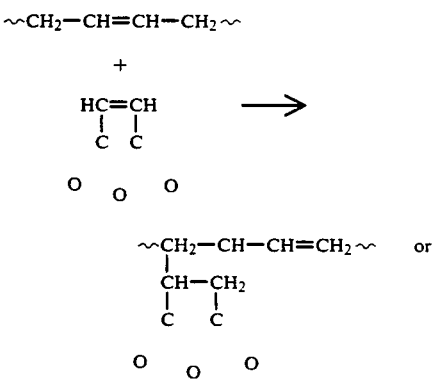

-continued

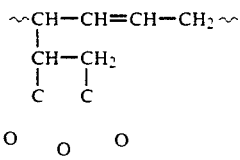

Maleic acid compounds which are suitably employed in the production of the maleated, partially hydrogenated block copolymers are maleic acid, maleic anhydride, mono-alkyl esters of maleic acid wherein the alkyl is alkyl of up to 4 carbon atoms inclusive, the mono-amide of maleic acid and maleic imide. Of these, the use of maleic acid is preferred.

The maleated, partially hydrogenated block copolymers are known in the art as is the method of their production. In general, the process for the production of the maleated product is a graft process wherein the maleic acid compound is grafted onto the mid-block of the partially hydrogenated block copolymer chain. In one modification the partially hydrogenated block copolymer and the maleic acid compound are contacted in the presence of a free radical initiator which is preferably a peroxy compound. The contacting customarily takes place at a temperature sufficient to melt the reactants and decompose the free radical initiator, e.g., a temperature from about 75° C. to about 450° C., more often from about 200° C. to about 300° C. Such reactions are conducted without solvent and often are conducted in an extruder which serves to mix and melt the reactants and to heat the mixture to the desired elevated temperature. In certain alternate modifications, the maleic acid compound and the partially hydrogenated block copolymer are contacted in a solvent such as benzene, toluene or xylene and reacted in the absence of a free radical initiator at elevated temperatures on the order of about 150° C. to about 200° C. In these latter modifications a free radical inhibitor is often employed to reduce gellation.

The extent of maleation of the partially hydrogenated block copolymer is dependent in part upon the residual aliphatic unsaturation of the polymeric aliphatic block. In terms of the preferred polymers as described above, sufficient maleic acid compound is reacted with the partially hydrogenated block copolymer to produce a maleated derivative containing from about 0.02% by weight to about 20% by weight, based on total polymer, of the moiety derived from the maleic acid compound grafted onto the polymeric aliphatic block. Preferably, the maleated polymer will contain from about 0.1% by weight to about 10% by weight, on the same basis, of the maleic acid compound moiety and most preferably, from about 0.2% by weight to about 5% by weight of the maleated acid compound moiety.

In general, the solvent-free "extruder-type" maleation process is preferred. Such processes are well known and conventional and are illustrated by the disclosures of U.S. Pat. Nos. 4,292,414, 4,427,828, 4,628,072, 4,659,970 and 4,657,971 which also describe the maleated products. Other processes are described by U.S. Pat. Nos. 4,578,429 and 4,670,173.

Certain of the maleated, partially hydrogenated block copolymers are commercial and are marketed by Shell Chemical Company under the trademark KRATON G ®. A particularly preferred maleated, partially hydrogenated block copolymer is marketed as KRATON G ® 1901X Thermoplastic Rubber and is characterized as a maleated block copolymer of the SES/SEBS type with a maleic acid functionality, as grafted maleic anhydride, of 2% by weight.

The maleated, partially hydrogenated block copolymer is present in a minor proportion in the blends of the invention. The amount of the maleated polymer is suitably from about 0.5% by weight to about 40% by weight, based on total polymer blend, and will be employed in an amount no greater than the lesser of the polyketone polymer or the polyamide. Amounts of maleated, partially hydrogenated block copolymer from about 5% to about 30% on the same basis are preferred. In yet another preferred embodiment, the relative amount (weight ratio) of polyamide to elastomeric copolymer should be from about 1:1 to about 4:1, preferably about 2:1. Where low temperature end uses are desired, the weight ratio of polyamide to elastomeric copolymer should be about 1:1. In a particularly preferred embodiment the ratio of linear alternating polymer to polyamide to elastomeric copolymer is about 40:40:20.

The optional fourth component of the blends of the invention, present as a minor component if present at all, is an acidic polymer containing moieties of an α-olefin and an α,β-ethylenically unsaturated carboxylic acid, optionally polymerized with a third component and optionally having a portion of the acidic carboxylic acid groups of the polymer neutralized with a non-alkali metal. The α-olefin monomer of this optional blend component is an α-olefin of up to 10 carbon atoms inclusive such as ethylene, propylene, 1-butene, 1-octene and 1-decene. Preferred α-olefins have up to 4 carbon atoms and particularly preferred is ethylene. The α-olefin monomer of this optional blend component is present in at least 65% by mole of the acidic optional component and is preferably present in at least 80% by mole on the same basis.

The ethylenically unsaturated carboxylic acid monomer is an α,β-ethylenically unsaturated carboxylic acid of up to 10 carbon atoms inclusive and is illustrated by acrylic acid, 2-hexenoic acid, 2-octenoic acid and 2-decenoic acid. The preferred α,β-ethylenically unsaturated carboxylic acids have up to 4 carbon atoms inclusive. These are acrylic acid, methacrylic acid and crotonic acid, of which, acrylic acid and methacrylic acid are particularly preferred. The unsaturated carboxylic acid monomer of the optional blend component is present in an amount of from about 1% by mole to about 35% by mole, based on total polymer, but amounts from about 5% by mole to about 20% by mole on the same basis are preferred.

The acidic polymeric optional blend component is suitably a copolymer of the α-olefin and the α,β-unsaturated carboxylic acid and in general such copolymers are preferred. On occasion, however, it is useful to incorporate as an optional third monomer a non-acidic low molecular weight polymerizable monomer of up to 8 carbon atoms inclusive. Such optional third monomer may be another α-olefin such a propylene or styrene when the major α-olefin monomer is ethylene, an unsaturated ester such as vinyl acetate or methyl methacrylate, an unsaturated halohydrocarbon such as vinyl fluoride or vinyl chloride, or an unsaturated nitrile such as acrylonitrile. As previously stated, the presence of this non-acidic low molecular weight monomer is optional and is not required. When the third monomer is possibly present, amounts of the third monomer up to about 5% by mole, based on total optional third component, are satisfactory with amounts of from about 0.3% by mole to about 3% by mole on the same basis being preferred.

Independent of whether the optional fourth blend component is a copolymer or a terpolymer, in an optional embodiment of this fourth component a portion of the carboxylic acid groups is neutralized with a non-alkali metal. When partially neutralized this blend component is polymeric in form while exhibiting ionic character and is conventionally referred to as a metal ionomer. In the partially neutralized embodiment of the optional fourth blend component, the α-olefin/unsaturated carboxylic acid polymer, with or without the optional non-acidic, low molecular weight polymerizable monomer, is reacted with a source of ionizable zinc, aluminum or magnesium compound sufficient to neutralize from about 10% to about 90% of the carboxylic acid groups present in the polymer. Such neutralization, particularly with zinc, the preferred metal, results in a uniform distribution of the metal throughout the polymer. Neutralization of from about 20% to about 80% of the carboxylic acid groups is preferred and neutralization of from about 25% to about 75% of the carboxylic acid groups is particularly preferred. The ionizable metal compound utilized in the neutralization is a source of complexed or uncomplexed non-alkali metal ions including zinc ions, aluminum ions or magnesium ions which are provided in compounds of the type often referred to as metal salts, e.g., uncomplexed salts such as zinc chloride, zinc formate or zinc acetate, or complexed metal salts wherein the metal is bonded to two types of groups, at least one of which is readily ionizable and the other is not. Illustrative of such complexed ions are mixed zinc salts with one weak acid such as oleic acid or stearic acid and one more-ionizable acids such as acetic acid or formic acid. In general, neutralization with a complexed ion is preferred.

The optionally partially neutralized polymers employed as the optional fourth component of the blends of the invention are broadly conventional and many are commercial. Copolymers of ethylene and acrylic acid are marketed by DuPont under the trademark PRIMACORE ® and copolymers of ethylene and methacrylic acid are marketed under the trademark NUCREL ®. Partially neutralized polymers are marketed by DuPont under the trademark SURLYN ®. The amount of optional fourth component is up to about 10% by weight based on total polymer blend provided that the optional fourth component, when present, is present in a quantity less than any of the polyketone polymer, the polyamide or the modified block copolymer. Amounts of the optional blend component, when the optional fourth component is employed, from about 0.1% by weight to about 2% by weight on the same basis are preferred.

The method of producing the blend of the polyketone polymer and the minor components of the blend is important. In one aspect there needs to be sufficient mixing such that a uniform mixture of the components is obtained, i.e., a mixture which will not delaminate upon processing. In another aspect, there needs to be sufficient time in the melt so that interphase adhesion is attained. This time depends primarily on the temperature of mixing, the particular component and their relative amounts. Typical mixing times are 1 to 10 minutes, preferably at least 2 minutes. The blend is a non-miscible blend. While the blend will not be homogeneous, good properties are obtained when the blend is uniform. The methods to be employed for the blending of the components are methods which are conventional for the blending of non-miscible thermoplastic materials. In one modification the components are blended in a twin screw co-rotating extruder to produce the blend as an extrudate. In an alternate modification the components are blended in a mixing device which exhibits high thermal energy and high shear.

The blends of the invention may also include conventional additives such as antioxidants, stabilizers, mold release agents and colorants which increase the processability of the blend components or modify the properties of the resulting blend. Such additives are incorporated within the blend by conventional methods prior to, together with or subsequent to the blending of the components.

The blends of the invention are characterized by a good combination of physical properties, particularly strength and toughness, especially at low temperatures. The blends are processed by conventional procedures, e.g., extrusion, injection molding and thermoforming into shaped articles of established utility such as films, fibers and containers. The blends find particular application where a combination of strength and toughness is desired, for example, in the production of both internal and external parts for automotive applications.

The invention is further illustrated by the following Illustrative Embodiments which should not be regarded as limiting.

ILLUSTRATIVE EMBODIMENT I

A linear alternating terpolymer of carbon monoxide, ethylene and propylene was produced in the presence of a catalyst composition formed from palladium acetate, trifluoroacetic acid and 1,3-bis[di(2-methoxyphenyl)-phosphino]propane. The terpolymer had a melting point of 219° C. and a limiting viscosity number (LVN) of 1.78 dl/g.

ILLUSTRATIVE EMBODIMENT II

A number of blends of the terpolymer of Illustrative Embodiment I, ZYTEL ® 101, a commercial Nylon 6,6, KRATON ® 1901X, a commercial maleated, partially hydrogenated block copolymer of the SES/SEBS type and, for all blends, 1% by weight based on total polymer blend of NUCREL ® 535, a commercially available copolymer of ethylene and methacrylic acid. The blends were compounded by passing the components through a Haake 30 mm co-rotating twin screw extruder operating in a temperature range of 280° C. in an air atmosphere. Test specimens were molded on a 30 ton Arburg injection molding machine. Certain of the blends were produced with short residence times in the molder and other blends were produced with longer residence times. Specimens were stored over desiccant prior to testing.

The impact properties at room temperature for a number of the blends, together with controls, were determined by standard techniques. The results are shown in Table I.

TABLE I

| Composition, % wt (ex NUCREL ®) | | | Notched Izod (ft lb/in) | |
|---|---|---|---|---|
| Ter-polymer | ZYTEL ® 101 | KRATON ® 1901X | Short | Long |
| A 100 | 0 | 0 | 4.7 | 5.7 |

TABLE I-continued

| Composition, % wt (ex NUCREL ®) | | | | Notched Izod (ft lb/in) | |
|---|---|---|---|---|---|
| Ter-polymer | | ZYTEL ® 101 | KRATON ® 1901X | Short | Long |
| B | 80 | 1 | 0 | 13.4 | 17.5 |
| C | 95 | 0 | 5 | 13.2 | 11.2 |
| D | 90 | 0 | 10 | 3.1 | 3.1 |
| E | 85 | 10 | 5 | 15.4 | 25.3 |
| F | 80 | 15 | 5 | 19.9 | 27.4 |
| G | 75 | 20 | 5 | 20.9 | 24.8 |
| H | 70 | 20 | 10 | 25.8 | 27.1 |
| I | 70 | 10 | 20 | 7.8 | 2.2 |
| J | 60 | 20 | 20 | 24.2 | 13.0 |
| K | 47.5 | 47.5 | 5 | 16.3 | — |
| L | 45 | 45 | 10 | 23.9 | 21.9 |
| M | 40 | 40 | 20 | 27.5 | 26.9 |
| N | 40 | 30 | 30 | no break | no break |
| O | 20 | 70 | 10 | 25.5 | — |
| P | 70 | 20 | 10 (no NUCREL ®) | 23.6 | 23.7 |

From Table I above, it is seen that composition A (pure polyketone) has a Notched Izod Short Value of 4.7 ft-Ib/in. Composition B (polyketone+20% Nylon) has an Izod value of 13.4 ft-Ib/in, while Composition D (polyketone+10% KRATON ®) has an Izod value of 3.1 ft-Ib/in. One skilled in the art would expect a combination of Compositions D and B to have an Izod value of about 16.5 ft-Ib/in i.e. to show an additive effect. Surprisingly, Composition H (polyketone+20% Nylon+10% KRATON ®) has an Izod value of 25.8 ft-Ib/in—a significant improvement over the expectations of the prior art. This synergistic result attributable to the ability of the polyketone to function as a matrix and of Nylon to function as a compatibilizer is not disclosed by the teachings of the prior art.

The impact properties at −30° F. for a number of the blends were determined by standard techniques. The results are shown in Table II.

TABLE II

| Composition, % wt (ex NUCREL ®) | | | | Notched Izod (ft lb/in) | |
|---|---|---|---|---|---|
| Ter-polymer | | ZYTEL ® 101 | KRATON ® 1901X | Short | Long |
| A | 100 | 0 | 0 | 1.5 | — |
| B | 80 | 20 | 0 | 1.4 | — |
| C | 95 | 0 | 5 | 1.9 | — |
| D | 90 | 0 | 10 | 1.5 | — |
| E | 85 | 10 | 5 | 2.0 | 2.9 |
| F | 80 | 15 | 5 | 2.7 | — |
| G | 75 | 20 | 5 | 2.2 | — |
| H | 70 | 20 | 10 | 2.7 | 3.3 |
| I | 60 | 20 | 20 | 3.9 | 2.4 |
| J | 45 | 45 | 10 | 3.1 | — |
| K | 40 | 40 | 20 | 5.6 | 5.2 |
| L | 40 | 30 | 30 | 5.9 | 1.8 |

From Table II above, it is seen that Composition A has a low temperature Notched Izod Short Value of 1.5 ft-Ib/in; Composition B (containing 20% Nylon) has a decreased value of 1.4 ft-Ib/in; while Composition D (containing 10% KRATON ®) retains the value of 1.5 ft-Ib/in. Unexpectedly, Composition H (containing 20% Nylon and 10% KRATON ®) has an Izod Value of 2.7 ft-Ib/in. This phenomenal improvement exhibited by the inventive ternary blend composition is not disclosed or suggested by the prior art. Similar improvements in properties are shown by inventive Compositions C and G.

ILLUSTRATIVE EMBODIMENT III

The modulus, tensile strength and elongation of certain of the blends prepared by the procedure of Illustrative Embodiment II were determined by standard techniques. The results are shown in Table III.

TABLE III

| Composition, % wt (ex NUCREL ®) | | | | Modulus (Ksi) | Tensile Strength (psi) | Elongation (%) |
|---|---|---|---|---|---|---|
| Terpolymer | | ZYTEL ® 101 | KRATON ® 1901X | | | |
| A | 100 | 0 | 0 | 217 | 8470 | 310 |
| B | 80 | 20 | 0 | 307 | 9500 | 85 |
| C | 95 | 0 | 5 | 243 | 8500 | 98 |
| D | 90 | 0 | 10 | 224 | 6990 | 21 |
| E | 85 | 10 | 5 | 243 | 8140 | 163 |
| F | 80 | 15 | 5 | 263 | 8260 | 230 |
| G | 75 | 20 | 5 | 288 | 8550 | 323 |
| H | 70 | 20 | 10 | 262 | 7830 | 356 |
| I | 70 | 10 | 20 | — | 6160 | 102 |
| J | 60 | 20 | 20 | 191 | 6560 | 107 |
| K | 47.5 | 47.5 | 5 | 324 | 9510 | 174 |
| L | 45 | 45 | 10 | 297 | 8610 | 220 |
| M | 40 | 40 | 20 | 224 | 7020 | 306 |
| N | 40 | 30 | 30 | 134 | 4910 | 184 |
| O | 20 | 70 | 10 | — | 9300 | 95 |
| P | 70 | 20 | 10 (no NUCREL ®) | — | 7830 | 145 |

The stiffness and strength of the blends of the invention behave in a way that is approximately additive with respect to the strength and stiffness of each of the pure components. It is worth noting that the binary combinations, B (20% Nylon), C (5% KRATON ®), and D (10% KRATON ®) exhibited modest ductility, as measured by tensile elongations below 100%. In contrast, all of the ternary combinations (F through N) exhibited greater ductility, as measured by tensile elongations approaching or equivalent to those of the neat polyketone matrix, about 300%.

ILLUSTRATIVE EMBODIMENT IV

Blends were made according to the procedure of Illustrative Embodiment II in which the molecular weight of the polyketone polymer, as reflected by the LVN, measured in m-cresol at 60° C., was varied along with the percent composition. The mechanical properties of these blends, along with controls, were determined by standard techniques. The results are shown in Tables IV, V and VI.

TABLE IV

| Composition, % wt (ex NUCREL ®) | | | Room Temperature Notched Izod (ft lb/in) | |
|---|---|---|---|---|
| Terpolymer (LVN) | ZYTEL ® 101 | KRATON ® 1901X | Short | Long |
| 100 (1.88) | 0 | 0 | 4.8 | 6.2 |
| 100 (1.78) | 0 | 0 | 4.7 | 5.7 |
| 100 (1.62) | 0 | 0 | 4.1 | 4.1 |
| 100 (1.37) | 0 | 0 | 2.6 | 2.5 |
| 100 (1.26) | 0 | 0 | 2.1 | 2.1 |
| 70 (1.88) | 20 | 10 | 25.5 | 29.0 |
| 70 (1.78) | 20 | 10 | 25.8 | 27.1 |
| 70 (1.62) | 20 | 10 | 26.6 | 28.4 |
| 70 (1.37) | 20 | 10 | 19.7 | 24.7 |
| 70 (1.26) | 20 | 10 | 5.8 | 6.6 |
| 40 (1.78) | 40 | 20 | 27.5 | 26.9 |
| 40 (1.37) | 40 | 20 | 26.4 | 26.0 |
| 40 (1.26) | 40 | 20 | 27.2 | 26.8 |

TABLE V

| Composition, % wt (ex NUCREL ®) | | | −30° F. Notched Izod (ft lb/in) | |
|---|---|---|---|---|
| Terpolymer(LVN) | ZYTEL ® 101 | KRATON ® 1901X | Short | Long |
| 100 (1.88) | 0 | 0 | 1.3 | — |
| 100 (1.78) | 0 | 0 | 1.5 | — |
| 100 (1.62) | 0 | 0 | 1.2 | — |
| 100 (1.37) | 0 | 0 | 0.9 | — |
| 70 (1.88) | 20 | 10 | 2.3 | — |
| 70 (1.78) | 20 | 10 | 2.7 | — |
| 70 (1.62) | 20 | 10 | 2.9 | — |
| 70 (1.37) | 20 | 10 | 2.2 | — |
| 40 (1.78) | 40 | 20 | 5.6 | 5.2 |
| 40 (1.37) | 40 | 20 | 3.5 | — |

The data in Tables IV and V demonstrate that the inventive ternary blends effectively improve the impact strength of the pure polyketone matrix over a wide range of polyketone molecular weights.

TABLE VI

| Composition, % wt (ex NUCREL ®) | | | Modulus (Ksi) | Tensile Strength (psi) | Elongation (%) |
|---|---|---|---|---|---|
| Terpolymer(LVN) | ZYTEL ® 101 | KRATON ® 1901X | | | |
| 100 (1.78) | 0 | 0 | 217 | 8470 | 310 |
| 100 (1.62) | 0 | 0 | 228 | 8920 | 177 |
| 100 (1.37) | 0 | 0 | 241 | 9200 | 121 |
| 100 (1.26) | 0 | 0 | — | 9040 | 180 |
| 70 (1.78) | 20 | 10 | 262 | 7830 | 356 |
| 70 (1.62) | 20 | 10 | 250 | 7780 | 282 |
| 70 (1.37) | 20 | 10 | 236 | 7830 | 174 |
| 70 (1.26) | 20 | 10 | — | 7470 | 90 |
| 40 (1.78) | 40 | 20 | 224 | 7020 | 306 |
| 40 (1.37) | 40 | 20 | 231 | 7010 | 338 |
| 40 (1.26) | 40 | 20 | — | 6932 | 232 |

The data in Table VI illustrates that the inventive blends maintain good stiffness, strength, and ductility over a wide range of polyketone molecular weights.

While this invention has been described in detail for the purpose of illustration, it is not to be construed as limited thereby but is intended to cover all changes and modifications within the spirit and scope thereof.

What is claimed is:

1. A ternary polymer blend having improved mechanical properties comprising: (1) a major amount of a linear alternating polymer of carbon monoxide and at least one ethylenically unsaturated hydrocarbon; and lesser amounts of (2) a polymeric polyamide having recurring amide moieties in the polymer chain; (3) and a maleated, partially hydrogenated elastomeric copolymer in which (1) functions as a matrix and (2) functions as a compatibilizer.

2. A blend as in claim 1 wherein the linear alternating polymer is represented by the repeating formula $$\{CO\{CH_2-CH_2\}_x CO(G)\}_y$$

wherein G is the moiety of an ethylenically unsaturated hydrocarbon of at least 3 carbon atoms polymerized through the ethylenic unsaturation and the ratio of y:x is no more than 0.5.

3. A ternary polymer blend having improved mechanical properties comprising: (1) about 5 to about 85 percent by weight of a linear alternating polymer of carbon monoxide and at least one ethylenically unsaturated hydrocarbon; (2) about 2 to about 20 percent by weight of a polymeric polyamide having recurring amide moieties in the polymer chain; (3) about 0.5 to about 20 percent by weight of a maleated, partially hydrogenated elastomeric copolymer in which (1) functions as a matrix and (2) functions as a compatibilizer.

4. A blend as in claim 3 wherein the linear alternating polymer is represented by the repeating formula $$\{CO\{CH_2-CH_2\}_x CO(G)\}_y$$

wherein G is the moiety of an ethylenically unsaturated hydrocarbon of at least 3 carbon atoms polymerized through the ethylenic unsaturation and the ratio of y:x is no more than 0.5.

5. A blend as in claim 3 wherein the polyamide is a linear polyamide having up to 16 carbon atoms in each recurring unit and having a melting point over 200° C.

6. A blend as in claim 3 wherein the polyamide is homopolymeric or copolymeric.

7. A blend as in claim 6 wherein the homopolymeric polyamide is a polymer of caprolactam present in the blend in an amount of from about 1% by weight to about 30% by weight, based on total polymer blend.

8. A blend as in claim 6 wherein the copolymeric polyamide is the condensation product of the acyclic terminal primary diamine of the formula $$H_2N(CH_2)_n NH_2$$

wherein n is an integer from 2 to 16 inclusive with the aliphatic dicarboxylic acid of the formula $$H_2N(CH_2)_m CO_2H$$

wherein m is an integer from 0 to 14 inclusive.

9. A blend as in claim 3 wherein the maleated, partially hydrogenated block copolymer has from about 0.02% by weight to about 20% by weight based on total polymer of a maleic acid compound grafted onto the aliphatic portion of a partially hydrogenated block copolymer, the partially hydrogenated block copolymer having had hydrogenated no more than 5% of the aromatic unsaturation and from about 80% to about 99.5% of the aliphatic unsaturation of a block copolymer precursor, the block copolymer having at least one block of at least predominately polymerized vinyl aromatic compound and at least one block of at least predominantly polymerized conjugated alkadiene.

10. A blend as in claim 9 wherein the block copolymer is of the ABA type wherein A represents block of at least predominantly vinyl aromatic compound and B represents block of at least predominantly polymerized conjugated alkadiene, the A block content of the polymer being from about 2% by weight to about 65% by weight based on total block copolymer.

11. A ternary polymer blend having improved mechanical properties comprising: (1) substantially equal amounts of a linear alternating polymer of carbon monoxide and at least one ethylenically unsaturated hydrocarbon and of a polymeric polyamide having recurring amide moieties in the polymer chain, and (2) a lesser amount of a maleated partially hydrogenated elastomeric copolymer in which (1) functions as a matrix and (2) functions as a compatibilizer.

* * * * *